United States Patent
Nakamura et al.

(10) Patent No.: US 9,719,528 B2
(45) Date of Patent: Aug. 1, 2017

(54) BUBBLE LIFT SYSTEM AND BUBBLE LIFT METHOD

(75) Inventors: Takuju Nakamura, Tokyo (JP); Masaki Kawase, Tokyo (JP)

(73) Assignee: MODEC, INC., Tokyo (JP)

( * ) Notice: Subject to any disclaimer, the term of this patent is extended or adjusted under 35 U.S.C. 154(b) by 395 days.

(21) Appl. No.: 14/236,958

(22) PCT Filed: Jul. 27, 2012

(86) PCT No.: PCT/JP2012/069168
§ 371 (c)(1),
(2), (4) Date: Feb. 4, 2014

(87) PCT Pub. No.: WO2013/021840
PCT Pub. Date: Feb. 14, 2013

(65) Prior Publication Data
US 2014/0169989 A1   Jun. 19, 2014

(30) Foreign Application Priority Data
Aug. 9, 2011 (JP) .................................. 2011-174245

(51) Int. Cl.
*F04F 1/20* (2006.01)
*F04F 1/18* (2006.01)
(Continued)

(52) U.S. Cl.
CPC ............ *F04F 1/20* (2013.01); *B01D 19/0057* (2013.01); *E02F 3/8833* (2013.01);
(Continued)

(58) Field of Classification Search
CPC .......... F04F 1/20; F04F 1/18; B01D 19/0057; B01D 21/2466; E02F 3/8833;
(Continued)

(56) References Cited

U.S. PATENT DOCUMENTS

| | | | | |
|---|---|---|---|---|
| 1,374,952 A | * | 4/1921 | Rogers ...................... | F04F 1/20 417/109 |
| 1,790,975 A | * | 2/1931 | Dallas et al. ........... | C02F 3/223 210/194 |

(Continued)

FOREIGN PATENT DOCUMENTS

| CN | 1944950 A | 4/2007 |
|---|---|---|
| JP | 58-38856 A | 9/1956 |

(Continued)

OTHER PUBLICATIONS

International Search Report dated Oct. 16, 2012, issued in corresponding application No. PCT/JP2012/069168.

*Primary Examiner* — Bryan Lettman
*Assistant Examiner* — Timothy Solak
(74) *Attorney, Agent, or Firm* — Westerman, Hattori, Daniels & Adrian, LLP (57) ABSTRACT

In a bubble lift system, a pressurized chamber at an upper end portion of a riser pipe applies a pressure to an upper portion inside the riser pipe to suppress an increase in the volume ratio of bubbles to a fluid mixture rising inside the riser pipe in a shallow water region. The upper end of the riser pipe is not opened to the atmosphere but is inserted into the pressurized chamber under a high pressure to thereby prevent expansion of the bubbles and gas. In addition, a deaerator for discharging bubbles separated by a centrifugal force is also provided in a middle portion of the riser pipe in a shallow water region to distribute the bubbles more evenly inside the whole riser pipe. The bubble lift system and a bubble lift method thus provided are efficient and employable even in a deep water region.

16 Claims, 6 Drawing Sheets

(51) Int. Cl.
   *E21C 50/00* (2006.01)
   *B01D 19/00* (2006.01)
   *E02F 3/88* (2006.01)
   *E02F 3/92* (2006.01)

(52) U.S. Cl.
   CPC ............ *E02F 3/9243* (2013.01); *E21C 50/00* (2013.01); *F04F 1/18* (2013.01)

(58) Field of Classification Search
   CPC ......... E02F 3/9243; E02F 3/88; E02F 3/8841; E02F 3/885; E02F 3/902; E02F 3/94; E02F 7/00; E02F 7/005; E02F 7/023; E21C 50/00; C02F 7/00; C02F 2103/007; C02F 2103/008
   USPC ....... 417/108–117, 148, 70, 71, 85, 86, 118, 417/120, 123, 124, 125, 149; 210/170.04, 210/170.05, 170.09, 170.1, 170.11, 747.4, 210/747.5, 747.6, 220, 242.2, 523, 803; 261/77
   See application file for complete search history.

(56) References Cited

U.S. PATENT DOCUMENTS

| | | | | |
|---|---|---|---|---|
| 3,180,278 A * | 4/1965 | Klein | ................ | F04B 43/10 417/137 |
| 3,438,499 A * | 4/1969 | Reckers | ................ | C02F 3/121 210/195.1 |
| 3,749,522 A * | 7/1973 | Kazama | ................ | F04B 53/141 277/409 |
| 3,753,303 A * | 8/1973 | Holzenberger | ........... | E02F 3/88 37/309 |
| 3,765,727 A * | 10/1973 | Santangelo | ............ | E21C 50/00 37/309 |
| 3,883,424 A * | 5/1975 | Stamblesky | ............ | C02F 3/121 210/138 |
| 3,971,593 A * | 7/1976 | Porte | ................ | E21C 50/00 299/8 |
| 4,053,181 A * | 10/1977 | Saito | ................ | E02F 3/88 299/9 |
| 4,180,980 A * | 1/1980 | Marks | ................ | F24J 3/00 417/108 |
| 4,316,680 A * | 2/1982 | Phipps | ................ | F04F 1/18 37/321 |
| 4,409,746 A * | 10/1983 | Beck | ................ | B08B 9/08 37/195 |
| 4,475,932 A * | 10/1984 | Hull | ................ | B01D 19/0057 210/188 |
| 4,501,664 A * | 2/1985 | Heil | ................ | C02F 1/385 210/195.3 |
| 4,555,253 A * | 11/1985 | Hull | ................ | B01D 19/0057 210/188 |
| 4,647,272 A * | 3/1987 | Brown | ................ | F04F 1/18 417/109 |
| 4,666,377 A * | 5/1987 | Brown | ................ | F04F 1/18 417/53 |
| 5,435,914 A * | 7/1995 | Bernhardt | ................ | C02F 3/02 210/205 |
| 5,445,500 A * | 8/1995 | Taguchi | ................ | B67D 7/72 417/137 |
| 5,553,976 A * | 9/1996 | Korsgaard | ............. | E21B 17/22 138/113 |
| 6,220,822 B1 * | 4/2001 | Khudenko | ................ | F04F 1/18 417/54 |
| 6,383,369 B2 * | 5/2002 | Elston | ................ | C02F 9/00 210/104 |
| 7,114,883 B2 * | 10/2006 | De Baan | ................ | B63B 27/24 405/169 |
| 7,220,358 B2 * | 5/2007 | Schacht | ................ | B01D 65/00 210/636 |
| 7,658,229 B2 * | 2/2010 | Becker | ................ | E21B 43/122 137/155 |
| 7,785,479 B1 * | 8/2010 | Hosford | ............. | B01D 21/0012 210/786 |
| 8,318,008 B1 * | 11/2012 | Anderson | ............... | C02F 3/006 210/137 |
| 2007/0231158 A1 * | 10/2007 | Butler | ................ | E21B 43/122 417/54 |
| 2009/0047139 A1 * | 2/2009 | Braun | ................ | F04F 1/02 417/54 |
| 2009/0169397 A1 * | 7/2009 | Parr | ................ | F04B 47/04 417/54 |
| 2009/0236287 A1 * | 9/2009 | Vero | ................ | B01J 20/28009 210/663 |

FOREIGN PATENT DOCUMENTS

| | | | |
|---|---|---|---|
| JP | 52-020409 A | 2/1977 | |
| JP | 55-148976 A | 11/1980 | |
| JP | 56-88998 A | 7/1981 | |
| JP | 63-280900 A | 11/1988 | |
| JP | 04-80000 U | 7/1992 | |
| JP | 05-19600 U | 3/1993 | |
| JP | 2000-320500 | * 11/2000 | ................ F04F 1/18 |
| JP | 2003-20500 A | 1/2003 | |
| JP | 2005-291171 A | 10/2005 | |
| WO | 95/22678 A1 | 8/1995 | |

* cited by examiner

BUBBLE LIFT SYSTEM AND BUBBLE LIFT METHOD

TECHNICAL FIELD

The present invention relates to a bubble lift system and a bubble lift method for lifting a solid substance or a liquid substance such as sand, sediments, or minerals on a deep water bottom such as a sea bottom, a lake bottom or a river bottom, or in the ground further below the water bottom to a place above the water surface.

BACKGROUND ART

The gas lift technique has been widely used in crude oil production in order to efficiently lift a heavy oil, which is slightly lighter in weight than seawater, from a submarine oil field having a low natural flow pressure. In this technique, a gas having a small and relatively negligible mass is injected into a liquid inside a riser pipe to reduce the pressure of a liquid column inside the pipe by an amount corresponding to the volume ratio of the gas, and thereby a pushing force by a pressure of the seawater outside the riser pipe or a reservoir pressure is generated at the lower end portion of the riser pipe. It is confirmed that the bubble lift (including air lift or gas lift) technique is effectively usable even for a mineral or the like having a high specific gravity when the mineral is formed into slurry by being finely crushed and mixed with seawater or the like.

As an example of this type, as described in Japanese Patent Application Publication No. 2005-291171, a bubble jet type air lift pump or the like has been proposed to aim at an efficient apparatus which is capable of removing sediments such as earth, sand and sludge settled and compressed on the bottom of sea, a lake, a clamor a liquid storage tank, and achieves high liquid pumping performance. And a bubble jet type air lift pump including an air lift riser (riser pipe) through the inside of which water and air rise, and a bubble jet generator provided at a bottom portion of the air lift riser and configured to jet out water mixed with bubbles are proposed.

In the case of slurry, earth, sand, sludge, or the like (hereinafter collectively referred to as slurry) having a much higher specific gravity than the surrounding liquid (seawater or water), unless a considerable volume of bubbles is injected, the average specific gravity of the fluid mixture of the slurry and the gas in the pipe cannot be reduced to or below the specific gravity of the surrounding liquid. In this case, an upward flow cannot be generated inside the riser pipe, and consequently the pushing force due to a pressure difference between the inside and the outside cannot be generated at the lower end portion of the riser pipe.

On the other hand, as a fluid mixture including slurry and bubbles injected into the riser pipe at a deep water region or an intermediate-depth water region rises toward a shallow water region, the bubbles increase in volume along with a reduction in the pressure, but the liquid and solid scarcely increase in volume. Accordingly, the volume ratio of bubbles to the fluid mixture increases acceleratingly. As a result, as the fluid mixture approaches the upper end portion of the riser pipe, there arise problems, for example, that the flow velocity of the upward flow becomes excessively high; and a volume ratio of a to-be-lifted substance to the fluid mixture decreases relative to the rest of the mixture, which accordingly lowers the lifting efficiency, or in the worst case, make it impossible to lift the to-be-lifted substance at all. These problems are caused because a relation between the bubble volume and the water depth is a substantially inversely-proportional relation, and become more prominent as the water depth where the to-be-lifted substance exists becomes greater. Meanwhile, in terms of the vertical position inside the rise pipe, these problems occur remarkably when the bubbles rise to a shallow water region.

For example, in the case of gas lift of lifting a to-be-lifted substance from a sea bottom at a water depth of 100 m, the bubbles injected into the lower end portion of the riser pipe increase in volume only 10 times even at the upper end portion of the riser pipe. However, in the case of lifting a to-be-lifted substance from a sea bottom at a water depth of 5,000 m, the bubbles injected into the lower end portion of the riser pipe increase in volume as much as 500 times at the upper end portion of the riser pipe. To be more specific, the volume of bubbles injected at the water depth of 5,000 m increases only by 25% until the bubbles rise to a water depth of 4,000 m, then increases by 5 times at a water depth of 1,000 m, increases by 50 times at a water depth of 100 m, and further increases by 500 times near the water surface.

Here, an estimation is made for a typical case of lifting slurry heavier than seawater under a condition where the flow volume of bubbles is fixedly set, in consideration of erosion or the like, to a volume at which that the flow velocity at the upper end of the riser pipe may not exceed 10 m/sec, for example, even when only seawater is suctioned. In this case, slurry only slightly heavier by several percentages than the surrounding seawater can be lifted if a ratio of the bubbles to the fluid mixture at the upper end inside the riser pipe (hereinafter referred to as a bubble ratio) is controlled at 90% or below.

In addition, in the case of lifting slurry from the sea bottom at a water depth of 1,000 m under the same conditions, it is possible to lift only slurry heavier by at most about 20 percent than the seawater. For this reason, in order to lift a mineral or the like having a high specific gravity, a ratio of seawater to the slurry needs to be kept at a level at which the specific gravity of the slurry is 1.2 or less, whereas the slurry is stuck when a ratio of minerals contained becomes large. However, it is generally difficult to control a mixing ratio in such deep sea.

In summary, the bubble lift in the conventional technique cannot inject bubbles in an amount necessary to lift a substance having higher specific gravity than the surrounding seawater or the like in a deep water region. This is because, as the bubbles injected on the lower side of the riser pipe rise toward a vicinity of the upper end of the riser pipe, the volume of bubbles increases in substantially inverse proportion to the water depth. Hence, the conventional bubble lift has drawback in that the bubble lift does not work at all or is very inefficient even if it works.

PRIOR ART DOCUMENT

Patent Document
  Patent Document 1: Japanese patent application Kokai publication No. 2005-291171

SUMMARY OF THE INVENTION

Problem to be Solved by the Invention

The present invention has been made in consideration of the foregoing circumstances, and has an objective to provide a bubble lift system and a bubble lift method which are efficient and employable even in a deep water region in such a way that an upper end of a riser pipe is not opened to the atmosphere but inserted in the inside of a pressurized chamber under a high pressure to thereby prevent expansion of bubbles and gas, and that a deaerator for discharging bubbles separated by a centrifugal force is also provided in a middle portion of the riser pipe in a shallow water region to thereby make the bubbles distributed more evenly.

More specifically, the objective is to provide a bubble lift system and a bubble lift method for bubble lift of a target subject in the form of slurry or the like having a higher average specific gravity than surrounding seawater or the like from a deep water region. In the bubble lift, even though bubbles are injected into the riser pipe in the deep water region or an intermediate-depth water region in a volume effective at reducing the average pressure of a liquid column inside the riser pipe, the system and method are capable of preventing the volume of bubbles in a shallow water region from increasing to an excessively high babble ratio such as a ratio exceeding 90%, for example, of the volume of the fluid mixture. Here, the shallow water region is, for example, the uppermost portion of about one-tenth of the riser pipe; in other words, in the case of a water depth of 1,000 m, the uppermost portion of about 100 m, i.e., the portion from 100 m below the water surface to the vicinity of the water surface.

In addition, another objective is to provide a bubble lift system and a bubble lift method which are applicable for use to continuously lift slurry containing a mixture of seawater and mud with various particle sizes, a mineral crushed in pebble-level size, or the like. For this purpose, the system and method prevent the flow velocity from increasing to a level that may cause a problem of erosion even though the specific gravity of slurry decreases to the same level as seawater due to a reduction in a concentration of a solid in the slurry, or in contrast, the system and method prevent the slurry from being stuck even though the specific gravity of the slurry increases close to that of the simple solid.

Further, still another objective is to provide a bubble lift system and a bubble lift method in which, for handling such slurry, a slurry system in a riser pipe or a receiving apparatus does not need to be equipped with a rotating machinery or instrument, a shut-off valve, a pressure regulation valve, a throttle valve, an orifice or the like which is highly likely to become malfunction due to damage, breakage, galling, jamming or the like.

Means for Solving the Problem

A bubble lift system of the present invention to achieve the above objectives is a bubble lift system for lifting a solid substance or liquid substance on a water bottom or under the water bottom through a riser pipe to a vicinity of a water surface, the bubble lift system configured to: inject a gas into a lower side portion of the riser pipe to cause the gas in a bubble form to rise; and, by making use of an effect that the bubbles produce by reducing the pressure of a fluid column inside the riser pipe, suction a to-be-lifted substance at a lower end portion of the riser pipe and lift the to-be-lifted substance to a place above the water surface. In the bubble lift system, a pressurized chamber is provided at an upper end portion of the riser pipe, and the pressurized chamber applies a pressure to an upper portion inside the riser pipe to thereby suppress an increase in a volume ratio of the bubbles to a fluid mixture rising inside the riser pipe in a shallow water region.

In this configuration, the upper end portion of the riser pipe is not opened under the atmospheric pressure, but is inserted and is opened in the pressurized chamber whose inside is under an increased pressure. In bubble lift of lifting slurry having 1.5 times the specific gravity from a sea bottom at a water depth of 5,000 m, for example, the inside of the pressurized chamber is set under an increased pressure of about 20 atmospheres, which is equivalent to the hydraulic pressure at a water depth of 200 m that is 1/25 of 5,000 m. With this setting, the volume of bubbles injected at the lower end portion of the riser pipe increases only by 25 times near the upper end of the riser pipe, and thus the expansion of bubbles can be suppressed remarkably as compared with 500 times in the case where the upper end of the riser pipe is opened under the atmospheric pressure.

Note that, in this case, 200 m below the upper end of the riser pipe, the pressure inside the riser pipe is about 25 atmospheres, whereas the hydraulic pressure outside the riser pipe is about 20 atmospheres. Such a phenomenon in which the pressure inside the riser pipe becomes higher than the hydraulic pressure outside the riser pipe in a shallow water region cannot occur without the presence of the pressurized chamber.

Moreover, the pressurized chamber can have a function as a separator to separate a gas from slurry including a to-be-lifted substance by centrifugal separation using the flow velocity of the fluid, gravity separation or the like. In this case, also, the separated gas can be sent to a compressor while being still compressed without expansion under the atmospheric pressure, and then be reused as the compressed air for bubble lift.

In addition, the foregoing bubble lift system is further provided with a deaerator in a middle portion of the riser pipe near the upper end portion. The deaerator is configured to swirl the fluid mixture inside the riser pipe, gather the bubbles and the gas in the fluid mixture towards the swirl axis by a centrifugal effect, and to discharge the bubble and the gas from the swirl axis to the outside of the riser pipe.

In this configuration, the deaerator is provided, for example, at an appropriate location at a water depth of around 200 m. In this case, the fluid mixture rising together with bubbles inside the riser pipe is led into a spiral flow and thus is swirled by a snail shape portion (volute portion). Then, the bubbles and the gas are gathered towards a swirl axis part by a centrifugal separation effect of a centrifugal force pushing the slurry containing the to-be-lifted substance in the fluid mixture toward the outer wall, and the excessive bubbles and gas are discharged to the outside of the riser pipe from a ventilation pipe (vent pipe) inserted in the swirl axis part. In this way, the gas volume can be reduced at this water depth. In order that the fluid mixture after bubble reduction can be efficiently lifted in a portion above the deaerator, the slurry and the bubbles in the fluid mixture are mixed well with each other by stator vanes or the like provided inside the pipe.

The deaerators of the present invention may be provided to two or more locations at different water depths and may each perform deaeration (vent) in a small volume. With this configuration, the volume ratio occupied by bubbles can be made uniform from the deep water region to the shallow water region. Accordingly, the flow velocity of the fluid is made more uniform, and the fluid lifting efficiency can be maximized.

In addition, in the foregoing bubble lift system, an application pressure of the pressurized chamber is set within such a preset pressure range that an injection volume of the gas injected into the lower side portion of the riser pipe has no need to be controlled dynamically according to a suctioning condition, that a flow velocity of the fluid mixture is kept within a predetermined range even when only surrounding water is suctioned, and that even when only a to-be-lifted substance is suctioned, a design upper limit of specific gravity is still higher than the specific gravity of the suctioned substance.

This configuration enables efficient lifting of a to-be-lifted substance only by: setting the application pressure of the pressurized chamber within the pressure range preset by previous computing simulation or the like in consideration of a lifting depth, the specific gravity of the to-be-lifted substance, and the like; and then adjusting the application pressure of the pressurized chamber to be within the pressure range.

In addition, the foregoing bubble lift system is configured to adjust the pressure of the pressurized chamber to 1/50 to 1/3, both inclusive, or more preferably 1/50 to 1/10, both inclusive, of the hydraulic pressure of the lower end portion of the riser pipe. If this pressure is lower than 1/50, the bubble volume suppression effect by the pressurized chamber is so small that the provision of the pressurized chamber brings no advantage at all. In contrast, if the pressure is larger than 1/3, the pressurized chamber needs to have high pressure resistance, so that the pressurized chamber should meet the higher property requirement, but cannot be expected to improve its lifting performance any more. In addition, by setting the upper limit to 1/10, the pressure resistance required for the pressurized chamber can be made low, the receiving apparatus can be made compact as a whole, and sufficient lifting performance can be achieved by using a deaeration system together as needed.

Further, the foregoing bubble lift system is configured to recycle the gas separated in the pressurized chamber to a compressor while being still compressed, to compress the gas again in the compressor and then to send the gas to the lower side of the riser pipe. This configuration can save the energy necessary for compression.

Moreover, in the foregoing bubble lift system, a single-stage or multi-stage (or two or more stages) upward flow weir, each stage of which includes a pressure container and a slurry pipe, is provided downstream of the pressurized chamber in order to keep the pressure of the pressurized chamber within a design range, and each stage of the upward flow weir keeps the pressure of a downstream side of the slurry pipe within a preset pressure range (a design range) by controlling the pressure of a gaseous portion in the pressure container encompassing an upper end of the slurry pipe.

The slurry accumulated in a lower portion of the pressurized chamber is pushed out by the pressure inside the pressurized chamber and flows upward inside the slurry pipe provided in the dedicated pressure container on the downstream side. While flowing upward inside this slurry pipe, the slurry loses a pressure by an amount corresponding to the column and accordingly is decompressed. The pressure inside the pressure container containing the slurry pipe therein is kept lower by a certain degree than the pressure inside the pressurized chamber so as to be in substantially equilibrium with the pressure of the decompressed slurry.

After flowing upward in the slurry pipe of the upward flow weir, the slurry falls down into the corresponding pressure container, and the slurry accumulated in the bottom portion of the pressure container is pushed out to another pressure container including the next slurry pipe on the downstream side. By repeating this, the pressure of the slurry is reduced to the atmospheric pressure eventually. In the present invention, a slurry system in the riser pipe or a receiving apparatus does not need to be provided with a rotating machinery or instrument, a shut-off valve, a pressure regulation valve, a throttle valve, an orifice or the like which is highly likely to become malfunction due to damage, breakage, galling, jamming or the like in the above process.

Moreover, in the foregoing bubble lift system, a communication pipe through which the gaseous portion of the pressure container of the upward flow weir and an upper portion of a U seal communicate with each other is provided, and the single-stage or multi-stage U seal using the pressures by liquid columns controls the pressures of the gaseous portions of the pressure containers. With this configuration, the operating pressure of each of the pressure containers including the slurry pipes in the upward flow weir can be kept by controlling the gas pressure of the pressure container. The control of the gas pressure can be made by a pressure regulation valve or the like provided in the gaseous portion, but may be made by a multi-stage seal having stages of a number corresponding to the number of stages of the upward flow weir and using the pressures of the liquid columns. The use of the multi-stage U seal makes it possible to avoid a trouble which the pressure regulation valve or the like would otherwise have due to sand, dirt and the like drifting in a cloud-like mass.

The foregoing configuration produces an effect of enabling maintenance-free continuous operation because the operating pressure can be kept within the design range, even when the specific gravity of slurry varies more or less, without needing a rotating machinery or instrument, a shut-off valve, a pressure regulation valve, a throttle valve, an orifice or the like, which is highly likely to become malfunction due to clogging caused by damage, breakage, galling, jamming or the like in a slurry system.

Hence, in the case of lifting a solid such as sand, sediment, or mineral from a deep sea bottom, a deep lake bottom, a deep river bottom or the ground below them, the foregoing configuration does not need the control of a mixing ratio of solid and seawater in slurry, which is generally considered difficult, and is capable of coping with ever-changing conditions in the size or hardness of particles of the solid contained in the slurry, the specific gravity of the slurry, and the like.

There is a demand for an ideal ability to lift a fluid mixture with the injection volume of bubbles set to a fixed volume, by controlling the flow velocity at the upper end of the riser piper within a design maximum flow velocity even when only seawater is suctioned, and by preventing the fluid mixture from being stuck (stopping rising) even when only the solid is suctioned.

According to the present invention, the pressure of the chamber stops an increase in the flow velocity, before a pressure loss that is substantially proportional to a square of the flow velocity becomes excessive. Hence, even when slurry lighter than the design specific gravity is suctioned, the flow velocity does not increase excessively. For example, in the bubble lift of lifting a solid having two or more times the specific gravity of seawater at a water depth of 5,000 m, continuous operation can be practically carried out with the injection volume of bubbles set to a fixed volume even through the concentration of the seawater in the slurry becomes 100% or even though the concentration of the solid in the slurry becomes 100%.

Moreover, in the foregoing bubble lift system, the bubbles or gas discharged to the outside of the riser pipe via the deaerator is recycled into the inside of the pressurized chamber through a vented air conveyor pipe connected to the ventilation pipe. This configuration can save the energy necessary for compression by circulating the discharged gas together with the gas separated in the pressurized chamber to the compressor without the discharged gas expanded to the atmospheric pressure, and by reusing the gas as bubbles for bubble lift.

In addition, in the foregoing bubble lift system, a multistage compressor is used to compress the gas separated in the pressurized chamber and to send the gas to the lower side of the riser pipe again, and the bubbles or gas discharged to the outside of the riser pipe from the ventilation pipe in the deaerator is recycled through a vented air conveyor pipe connected to the ventilation pipe to a stage in the multi-stage compressor having a higher pressure than that for the gas from the pressurized chamber. This configuration can further save the energy necessary for compression by circulating the discharged gas kept under high pressure to the compressor and by reusing the gas as bubbles for bubble lift.

Further, the foregoing bubble lift system is configured control the vent volume above the water surface by providing the vented air conveyor pipe with a pressure regulation valve, a throttle valve, an orifice or the like above the water surface.

Still further, in the foregoing bubble lift system, the deaerator is provided in a shallow water region where the pressure inside the riser pipe is made higher than the pressure outside the pipe due to the effect by the pressurized chamber, and discharges the bubbles or gas to water outside the riser pipe by using a pressure difference between the inside and the outside. In this case, the vented air conveyor pipe extending from the deaerator to above the water surface can be omitted. Thus, the system configuration can be simplified.

Still furthermore, in the foregoing bubble lift system, the deaerator is provided with a pressure relief valve at the ventilation pipe. The pressure relief valve acts in response to the pressure difference between the inside and the outside of the riser pipe. Thus, the deaerator is configured to adjust the pressure inside the riser pipe by controlling the vent volume with the pressure relief valve. In this configuration, the ventilation pipe of the deaerator is provided with the pressure relief valve configured to open and close when the pressure difference between the inside and the outside of the riser pipe reaches a pressure of 5 atmospheres, for example, that is equivalent to an original level thereof. Even when more bubbles are injected from the lower side portion of the riser pipe, the bubbles can be discharged at a depth where the deaerator exists, before the volume of bubbles becomes excessive at the upper portion of the riser pipe, until the pressure difference is reduced to a pressure of 5 atmospheres that is equivalent to the original level.

In other words, the bubbles or gas discharged from the deaerator may be guided through the vented air conveyor pipe (vent-dedicated pipe) to above the water surface and released under the atmospheric pressure or released under an increased pressure inside the pressurized chamber, or may be guided to the compressor and reused. Instead, the bubbles or gas may be discharged to water outside the riser pipe by making use of a phenomenon in which the pressure inside the riser pipe is made higher than the hydraulic pressure outside the pipe, the phenomenon being specific to the case where the pressurized chamber exists.

A bubble lift method of the present invention to achieve the above objectives is a bubble lift method including:

installing a riser pipe such that the riser pipe extends from a vicinity of a water surface down to a water bottom or under the water bottom; injecting a gas in the form of bubble into a lower side of the riser pipe to cause the bubbles to rise; and by making use of an effect that the bubbles produce by reducing the pressure of a fluid column inside the riser pipe, suctioning a to-be-lifted substance, collected around a lower end of the riser pipe, into a lower end side of the riser pipe, and lifting a fluid mixture containing the to-be-lifted substance to a receiving apparatus provided at an upper end of the riser pipe. In this method, a pressurized chamber provided at an upper end portion of the riser pipe applies a pressure to an upper portion inside the riser pipe.

This method can suppress an increase in the volume ratio of bubbles or gas to the fluid mixture near the upper end of the riser pipe. In addition, by only controlling the pressure application by the pressurized chamber without dynamic control of the air injection volume according to the suctioning condition, the flow velocity can be controlled within the design range even when only seawater is suctioned (the specific gravity becomes the minimum); or even when only a solid having a high specific gravity is suctioned, the specific gravity of the suctioned substance can be controlled within a design upper limit of specific gravity.

In addition, in the foregoing bubble lift method, a deaerator provided on an upper side of the riser pipe performs deaeration by removing part of the bubbles or gas in the fluid mixture. This method can further suppress an increase in the volume ratio of bubbles or gas to the fluid mixture near the upper end of the riser pipe.

Effects of the Invention

According to the bubble lift system and the bubble lift method of the present invention, a pressurized chamber is provided at an upper end portion of a riser pipe, whereby in bubble lift in a deep water region at a water depth of 5,000 m, for example, an increase in the volume ratio occupied by bubbles at the upper end portion of the riser pipe can be controlled within several ten times, which is a practical level. In contrast, in the conventional technique, the bubble lift under the same conditions is substantially impossible, because only a fluid slightly heavier by several percentages than seawater can be lifted in reality since the volume of bubbles at the upper end portion of the riser pipe becomes as much as 500 times the volume at the lower end portion of the riser pipe.

In this way, the bubble lift system can lift a to-be-lifted substance even in a deep water region which is tremendously deeper than in the case of the conventional technique, and thus can lift a target substance having a higher specific gravity. In addition, there is produced an effect of enabling efficient lifting by reducing a pressure loss that is substantially proportional to a square of the flow velocity. For example, the bubble lift of a fluid having more than two times the specific gravity of seawater at a water depth of 5,000 m is made possible with practically sufficient performance.

Moreover, by providing deaerators to middle portions of the riser pipe, not only the upper end portion of the riser pipe but also several locations in a shallow water region can be set as locations where the bubble ratio reaches the maximum. Thus, the volume ratio occupied by bubbles can be made uniform in the whole riser pipe from the deep water region to the shallow water region. As a result, the bubble ratio can be increased on average without an increase in the maximum flow velocity.

This makes it possible to significantly lower the flow velocity in the whole riser pipe, especially, the flow velocity at the upper end portion of the riser pipe, and hence to drastically reduce the erosion problem. As a result, the riser pipe, a portion connecting the upper end of the riser pipe to the downstream process, and the like can be formed by using a metal having lower hardness, using a lightweight material or a corrosion resistant material such as a plastic or elastomer, or using a coating material, a liner material, a vibration control material, a vibration damping material, an elastic material capable of absorbing deformation, or the like.

This consequently produces an effect of enabling bubble lifting in a deeper water region by using a lightweight riser pipe, a cost down effect by use of an inexpensive corrosion resistant coating or liner, and an effect of avoiding longitudinal vibration resonance with wave periods, vortex-excited vibration or the like by changing materials. In addition, this also enables, for instance, use of a flexible riser or bellows in which a thin metal plate is used on an inner surface, thereby making it unnecessary to use an expensive and complicated riser tensioner, telescopic joint or the like.

Additionally, since the flow velocity in the riser pipe is made uniform, this configuration solves problems such as a problem caused by a pulsating flow inside the riser pipe, a problem of a change in flow regime (bubble flow, slug flow, annular flow, mist flow, and the like) of a two-phase flow of slurry and bubbles, and a problem of solid-liquid separation in slurry due to a stuck state, and thereby enables efficient realization of a very long riser pipe.

The lifting operation in the deep water region using the bubble lift system and the bubble lift method of the present invention does not need highly-sophisticated components or heavy components requiring motive power and control, such as pumps and the like in a deep sea part or an intermediate-depth water part. Moreover, since bubbles reduce the specific gravity of a fluid mixture inside the riser pipe to or below the specific gravity of surrounding liquid such as seawater or water, it is possible to largely lower the design load required for a rig to support a resultant force of the weight of the rise pipe itself, a fluid weight, a tidal force and the like.

In addition, an evacuation needs to be done when the hydrographic conditions become blustery during the lifting operation. According to the bubble lift system and the bubble lift method of the present invention, the evacuation can be done only by pulling up the riser pipe in the exactly same manner as in a drilling rig of the conventional technique. Moreover, even when there occurs a situation where an evacuation is done with components outside a ship detached and left and where the left components cannot be retrieved eventually, it is possible to eliminate or minimize the possibility of leaving an expensive highly-sophisticated component and the like.

Further, the lift can be efficiently carried out with a relatively-narrow riser pipe having an equal diameter from the lower end to the top end. For this reason, the lift in a deep water region can be achieved by using, as it is, a riser pipe on the drilling ship or a drilling system for handling a riser pipe in the conventional technique. Accordingly, the development cost can be cut greatly.

BRIEF DESCRIPTION OF THE DRAWINGS

FIG. 3 is a schematic diagram illustrating a configuration of a receiving apparatus including a pressurized chamber, an upward flow weir, and the like.

MODES FOR CARRYING OUT THE INVENTION

Hereinafter, description is provided for a bubble lift system and a bubble lift method of embodiments according to the present invention. In this description, the present invention is explained by using an example of lifting a resource on a sea bottom by using a drill ship in the ocean, but the application range of the present invention is not limited to the ocean, but also includes lake, river, and the like.

Figure 1:
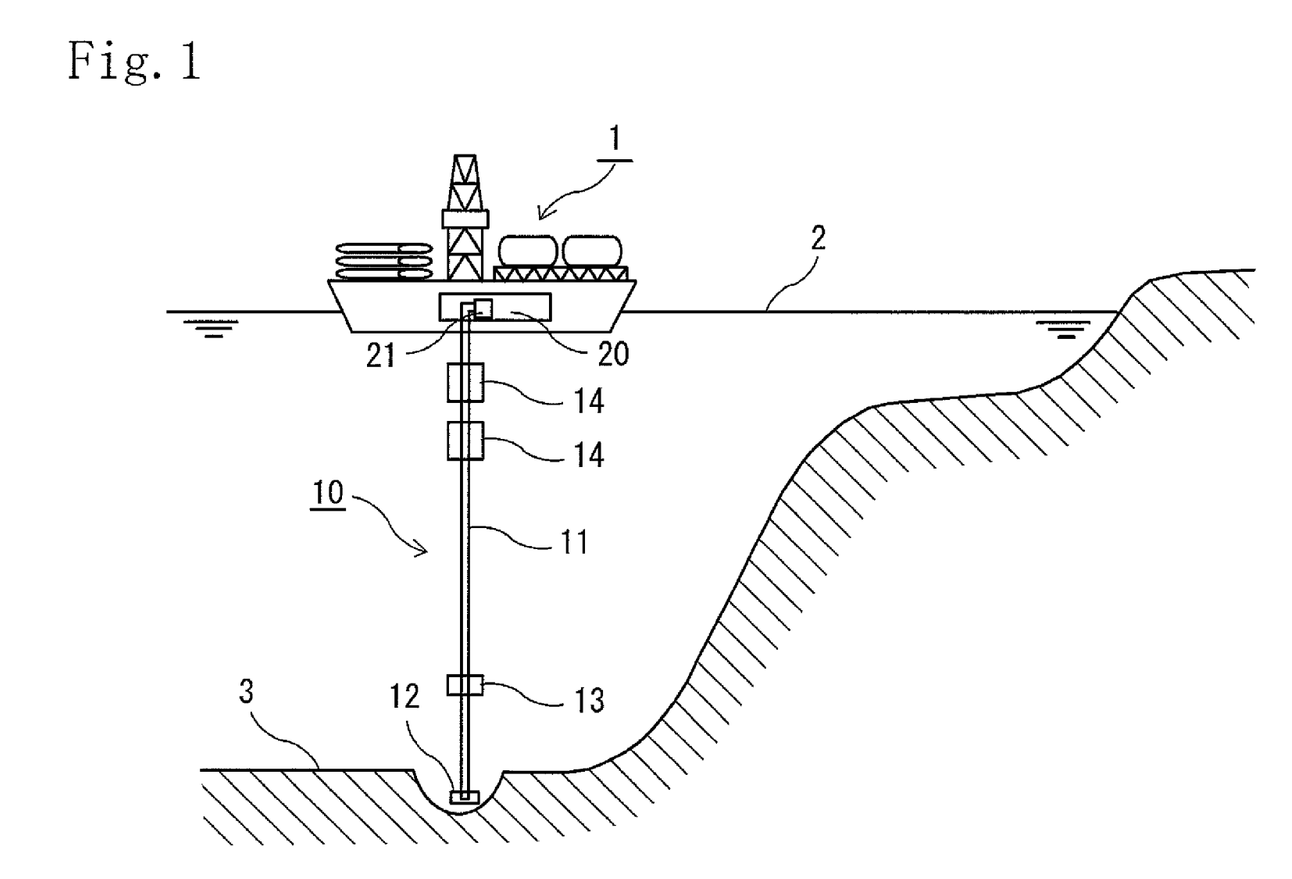
FIG. 1 is a schematic diagram illustrating a configuration of a bubble lift system in an embodiment according to the present invention.

A bubble lift system 10 of an embodiment according to the present invention has a configuration illustrated in FIG. 1. The bubble lift system 10 is a system used in a drill ship (drilling-rig vessel) 1 floating on a sea surface (water surface) 2 to lift a resource existing on a sea bottom (water bottom) 3 or under the sea bottom 3. The bubble lift system 10 includes a riser pipe 11, a collector 12, a gas injection apparatus 13, a deaerator 14, and a receiving apparatus 20.

This bubble lift system 10 is a system configured to lift a solid substance or a liquid substance (to-be-lifted substance) such as sand, sediment, or mineral on or under a water bottom 3 such as a sea bottom, a lake bottom or a river bottom through the riser pipe 11 to a vicinity of the water surface 2. For this purpose, a gas is injected and caused to rise in a lower side portion of the riser pipe 11. By making use of an effect that the gas produces by reducing the pressure of a liquid column inside the rise pipe 11, the to-be-lifted substance is suctioned together with surrounding water into the riser pipe 11 at the lower end portion of the riser pipe 11, and is lifted up together with the water and the gas to above the water surface 2.

As this drill ship 1, a drill ship is used which includes an automatic ship position maintaining system for lifting sediment on a very deep sea bottom. In addition, a riser pipe 11 of the drill ship 1 is used as the riser pipe 11 of the bubble lift system 10. The riser pipe 11 of the drill ship 1 is usually used to collect drilling mud in drilling operation in which a technique using the drilling mud is employed. Note that the bubble lift system 10 does not have to use the drilling function, itself, of a drilling rig included in the drill ship 1.

The riser pipe 11 includes many short pipes having an inner diameter of about 50 cm and a length of about 27 m and connected together by flanges. For the riser pipe 11, a material resistant to erosion is preferably used in a shallow water region where a flow velocity is relatively high, whereas a lightweight material is preferably used in an intermediate-depth water region and a deep water region. This riser pipe 11 is provided with the collector 12 in a lower end thereof, the gas injection apparatus 13 at one or more locations on the lower side, and the deaerator 14 at one or more locations on the upper side. The upper end side of the riser pipe 11 is connected to a pressurized chamber 21 of the receiving apparatus 20. Besides, an auxiliary pump, a crusher and the like may be additionally provided to the lowermost end or an intermediate portion of the riser pipe 11, if necessary. The lower end portion of the riser pipe 11 is provided with the collector 12 such as a strainer. The bubble lift system 10 may be configured using a minimum possible number of components, and does not need a heavy element or highly-sophisticated component such as a lower marine riser package (LMRP). Thus, the riser pipe 11 can be elongated by a length corresponding to the weight of the unnecessary component, and thereby be configured to cope with a deeper water region. In addition, in order to obtain the stability against a tidal force and the like, buoyant bodies (not illustrated) giving buoyant to the riser pipe 11 may be reduced in a deep water region.

In general, narrow pipes called a kill line and choke line used for a blowout preventer are disposed and held on the outside of a main pipe of the riser pipe 11. A high pressure narrow pipe disposed and held in the same manner is used as a pipe for sending compressed air for bubble lift to the gas injection apparatus 13 provided on the lower side of the riser pipe 11. Moreover, the gas injection apparatus 13 includes a short pipe of special specification provided with an air lift valve through which the compressed air is injected to the inside of the riser pipe 11. The short pipes of the gas injection apparatus 13 are used as several short pipes used in the deep water region and the intermediate-depth water region.

Figure 2:
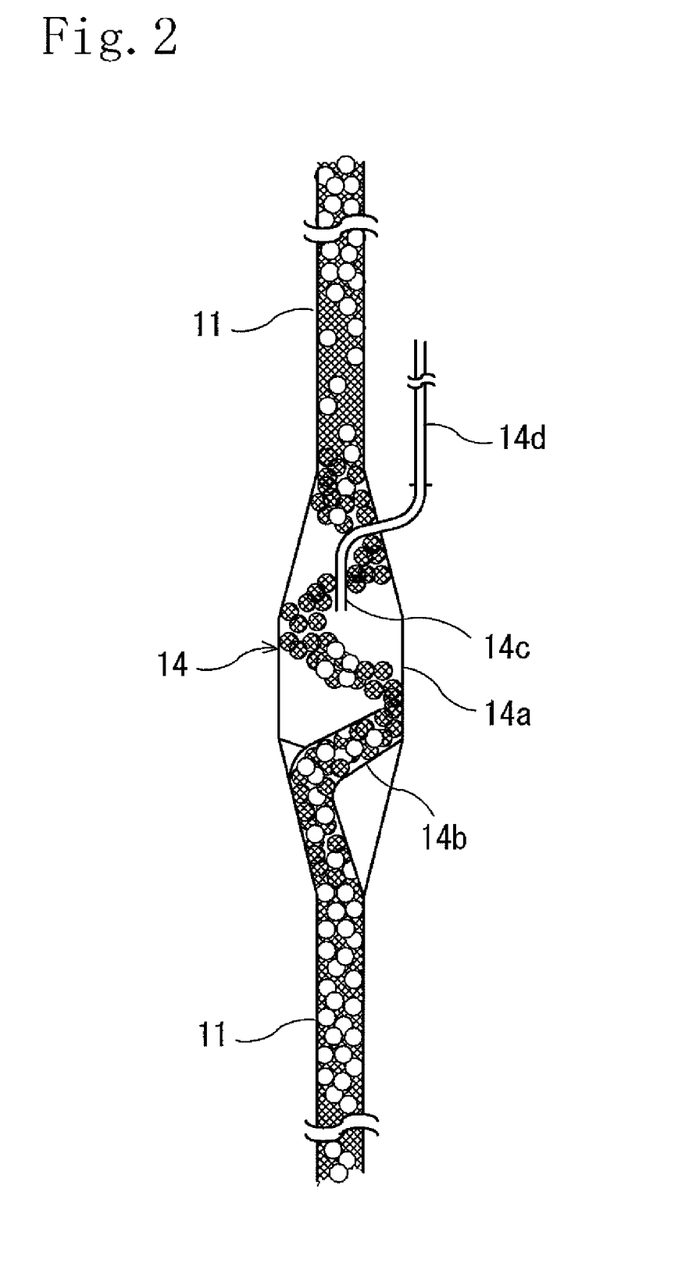
FIG. 2 is a schematic diagram illustrating a configuration of a deaerator.

In addition, short pipes of special specification provided with the deaerator 14 illustrated in FIG. 2 are used as several short pipes used in a shallow water region. The deaerator 14 includes an outer wall 14a, a spiral pipe 14b, a ventilation pipe 14c and a vented air conveyor pipe (vent-dedicated pipe) 14d. Incidentally, instead of the vented air conveyor pipe (vent-dedicated pipe) 14d, a pressure relief valve may be provided in some cases. In FIG. 2, a white circle indicates a bubble, a portion provided with cross hatching indicates slurry including a mixture of seawater and a target substance (sand, crushed mineral or the like), for example, a portion provided with single hatching indicates a portion having seawater only, and a white portion indicates a gas portion.

The outer wall 14a is formed with a larger diameter than the main pipe of the riser pipe 11 and includes a cylindrical portion, a lower tapered portion below the cylindrical portion and an upper tapered portion above the cylindrical portion. The outer wall 14a is formed in a size large enough to house the entire spiral pipe 14b and a part of the ventilation pipe 14c inside the outer wall 14a and to encompass the rotational flow of the fluid mixture flowing from the lower short pipe of the riser pipe 11.

The spiral pipe 14b is a pipe having a lower end connected to the main pipe of the riser pipe 11 on the lower side and being arranged spirally along the inside of the lower tapered portion of the outer wall 14a. The spiral pipe 14b has an opening portion at a place where the spiral pipe 14b enters the cylindrical portion of the outer wall 14a. The spiral pipe 14b is configured such that a fluid mixture flowing out from the spiral pipe 14b forms a rotational flow along the outer wall 14a. In other words, the spiral pipe 14b leads the fluid mixture inside the riser pipe 11 into a spiral flow to thereby generate the rotational flow.

The ventilation pipe 14c includes a pipe having an opening at a center portion in a cross section of the cylindrical portion of the outer wall 14a, and passing through the outer wall 14a to extend to the outside. The ventilation pipe 14c is connected to the vented air conveyor pipe (vent-dedicated pipe) 14d provided outside the main pipe of the riser pipe 11.

Basically, the deaerator 14 is configured to, on the upper side of the riser pipe 11, i.e., in a middle portion of the riser pipe 11 near the upper end thereof, generate a rotational flow of the fluid mixture rising inside the riser pipe 11, thereby to gather bubbles towards the swirl axis with a centrifugal effect, and to discharge the gathered bubbles to the outside of the rise pipe 11 from the ventilation pipe 14c provided with the opening portion at the swirl axis.

The deaerator 14 swirls the fluid mixture rising together with bubbles inside the riser pipe 11 by leading the fluid mixture into a spiral flow inside the snail-shaped spiral pipe (volute) 14b, gathers the bubbles towards the swirl axis part by using a centrifugal separation effect in which the to-be-lifted substance such as slurry is pushed toward the outer wall 14a by the centrifugal force, and discharges the excessive bubbles to the outside of the deaerator 14 from the ventilation pipe 14c inserted in the swirl axis part.

In the deaerator 14, the bubbles or gas discharged to the outside of the riser pipe 11 may be guided to above the water surface 2 through the vented air conveyor pipe 14d connected to the ventilation pipe 14c and then released to the atmosphere under an atmospheric pressure, or instead may be guided to the inside of the pressurized chamber 21 through the vented air conveyor pipe 14d connected to the ventilation pipe 14c, and released under an increased pressure. In the latter case, if the discharged gas is circulated into a compressor 30 together with a gas separated in the pressurized chamber 21 without being expanded to the atmospheric pressure, and thus is reused as bubbles for air lift, the energy necessary for compression can be saved.

Moreover, the vented air conveyor pipe 14d may be provided with a pressure regulation valve, a throttle valve, or an orifice above the water surface 2 so as to be capable of adjusting a vent volume to be recycled into the pressurized chamber 21 or the compressor 30. With this configuration, the vent volume can be adjusted above the water surface 2 as needed.

Further, a compressor 30 for compressing air consists of a multi-stage compressor 30 and is provided for injecting the compressed air into the lower side of the riser pipe 11, and is configured to compress the air (gas) separated in the pressurized chamber 21, and to send the compressed air again to the lower side of the riser pipe 11. The bubbles or gas discharged to the outside of the riser pipe 11 from the ventilation pipe 14c in the deaerator 14 is guided through the vented air conveyor pipe 11d connected to the ventilation pipe 11c to a stage in the multi-stage compressor 30 having a higher pressure than that for the gas from the pressurized chamber 21. In this way, the discharged gas is sent to the compressor 30 while being kept under a high pressure and is reused as bubbles for bubble lift. Hence, the energy necessary for compression is further saved.

Figure 7:
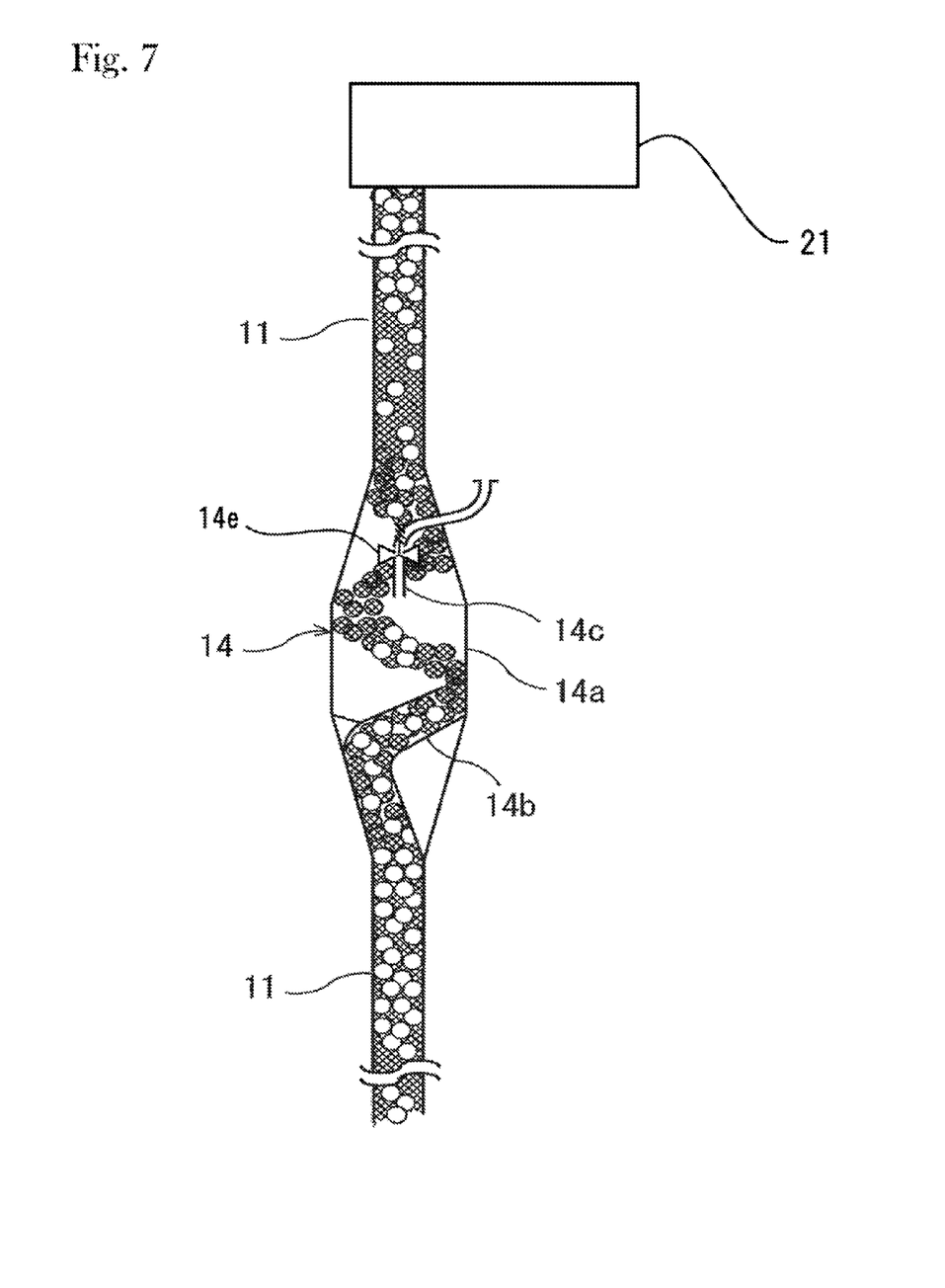
FIG. 7 is a schematic diagram illustrating a configuration of the deaerator of FIG. 2 in conjunction with a pressurized chamber.

The provision of the pressurized chamber 21 at the upper end of the riser pipe 11 as shown in FIG. 7 enables utilization of a specific phenomenon in which the pressure inside the riser pipe 11 is made higher than the hydraulic pressure outside the pipe. Thus, the deaerator 14 may be provided in a shallow water region where the pressure inside the riser pipe 11 is made higher than the pressure outside the pipe 11 due to the effect by the pressurized chamber 21, and may discharge bubbles or gas to seawater (water) outside the riser pipe 11 by using a pressure difference between the inside and the outside. In this case, the vented air conveyor pipe 14d is not necessary.

Additionally, as shown in FIG. 7, the ventilation pipe 14c is provided with a pressure relief valve 14e that acts in response to the pressure difference between the inside and the outside of the riser pipe 11. Thus, the deaerator 14 is configured to adjust the pressure inside the riser pipe 11 by controlling the vent volume with the pressure relief valve 14e. This configuration is very simple but is capable of adjusting the pressure inside the riser pipe 11.

Further, it is preferable that stator vanes or the like be provided to the inside the riser pipe 11 and that the to-be-lifted substance, bubbles and seawater be mixed well again so that the fluid mixture in which bubbles are reduced by the deaerator 14 can be efficiently lifted in a region above the point where the bubbles are reduced.

The deaerator 14 may be provided at multiple locations at different water depths (two locations in FIG. 1) and may perform deaeration (vent) gradually at multiple steps. With this configuration, the volume ratio occupied by bubbles in the fluid mixture rising inside the riser pipe 11 can be made substantially uniform from the deep water region to the shallow water region, and therefore the flow velocity of the fluid mixture can be made more uniform. Thus, the fluid lifting efficiency can be maximized.

In this configuration, the deaerator 14 is provided at an appropriate location such as a location around a water depth of 200 m, for example, and the ventilation pipe 14c is equipped with a pressure relief valve 14e configured to open and close when the pressure difference between the inside and the outside of the riser pipe 11 reaches a pressure of 5 atmospheres, for example, that is equivalent to an initial difference thereof. Even when more bubbles are injected from the lower side portion of the riser pipe 11, this configuration can discharge the bubbles in the deaerator 14 to the outside in the location at the water depth of 200 m before the volume of bubbles becomes excessively high in the upper portion of the riser pipe 11, until the pressure difference between the inside and outside is reduced to a pressure of 5 atmospheres that is equivalent to the original level.

Figure 3:
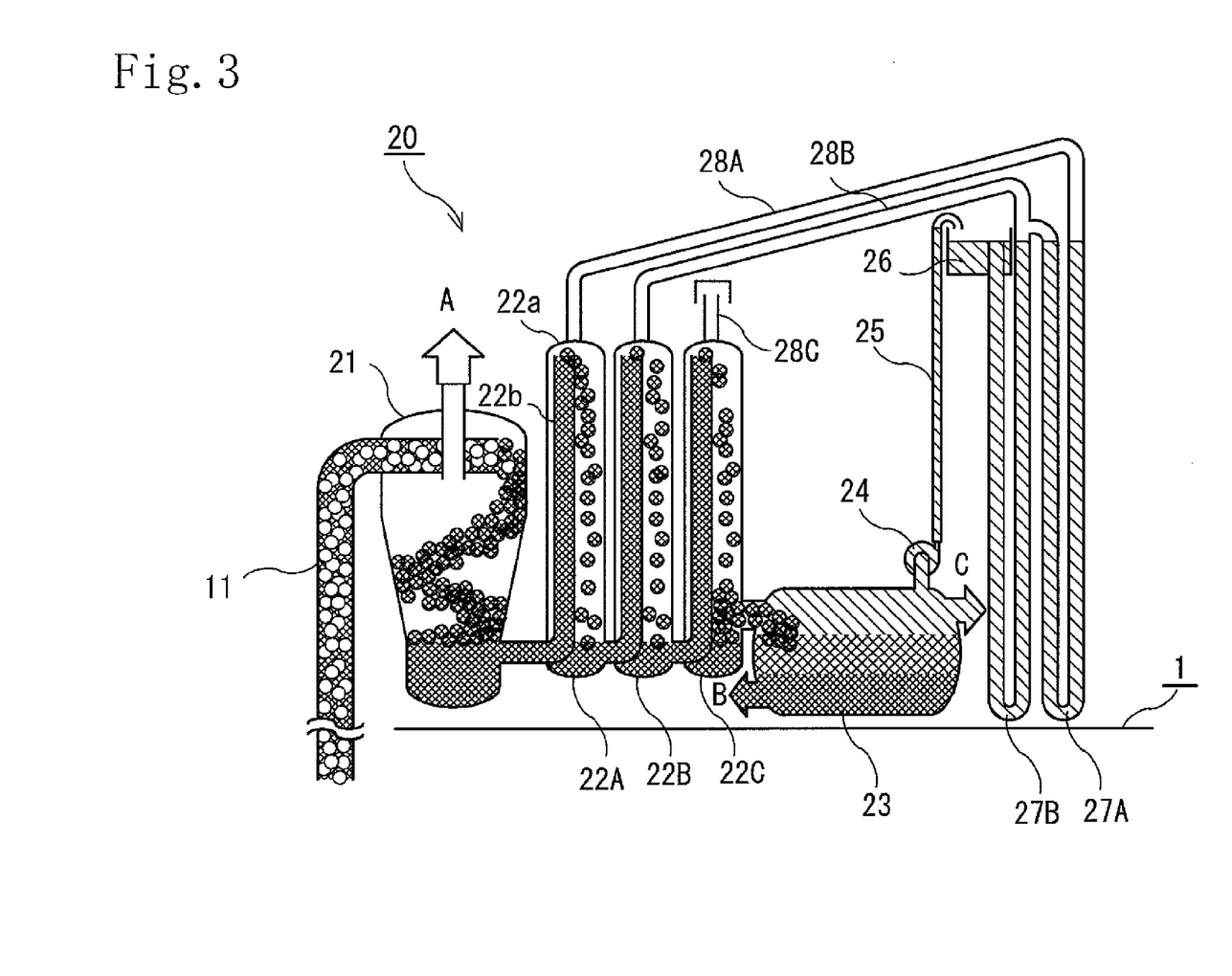
Figure 6:
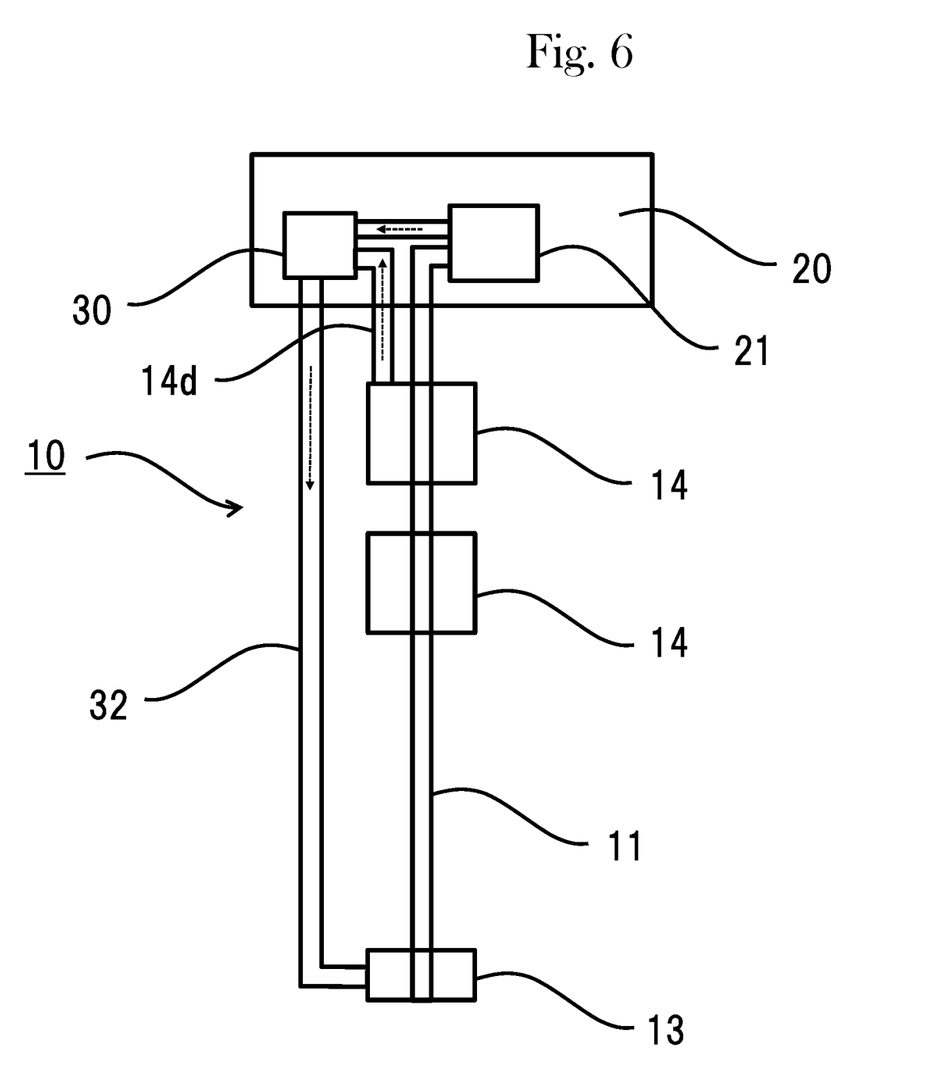
FIG. 6 is an enlarged schematic diagram of a portion of the configuration of a bubble lift system.

As illustrated in FIG. 3, the receiving apparatus (to-be-lifted substance receiving system) 20, a compressor 30 for generating compressed air for bubble lift, and the like are installed on the drill ship 1 to which the upper end portion of the riser pipe 11 extends. The receiving apparatus 20 includes the pressurized chamber 21, a multi-stage upward flow weir 22A, 22B, 22C, a separation tank 23, a U seal liquid refill pump 24, a U seal liquid refill pipe 25, a U seal liquid pool 26, a U seal (air trap) 27A, 27B, and the like. The main pipe of the riser pipe 11 is connected to the pressurized chamber 21 of the receiving apparatus 20, and an air-sending pipe 32 of the compressor 30 for sending the compressed air to the gas injection apparatus 13 (shown in FIG. 6) is connected to the high pressure narrow pipe (not illustrated) provided to the outside of the main pipe of the riser pipe 11.

The pressurized chamber 21 is provided at the upper end portion of the riser pipe 1 and is configured to apply a pressure to the upper portion inside the riser pipe 11. The pressurized chamber 21 thus configured suppresses an increase in the volume ratio of bubbles to the fluid mixture rising inside the riser pipe 11 in the shallow water region.

The pressurized chamber 21 is configured to provide an application pressure within such a preset pressure range that an injection volume of a gas injected into the lower side portion of the riser pipe 11 may have no need to be dynamically controlled according to a suctioning condition; the flow velocity of the fluid mixture can be controlled within a predetermined range even when only surrounding water is suctioned; even when only a to-be-lifted substance is suctioned, a design upper limit of specific gravity can be still higher than the specific gravity of the suctioned substance. This configuration enables efficient lifting of a to-be-lifted substance only by: setting the application pressure of the pressurized chamber 21 within the pressure range preset by previous computing simulation or the like in consideration of a lifting depth, the specific gravity of the to-be-lifted substance, and the like; and then adjusting the application pressure of the pressurized chamber 21 to be within the pressure range.

Moreover, it is preferable that the pressure of the pressurized chamber 21 be adjusted to 1/50 to 1/3, both inclusive, or more preferably 1/50 to 1/10, both inclusive, of the hydraulic pressure of the lower end portion of the riser pipe 11. If the pressure is lower than 1/50, the effect of the bubble volume suppression by the pressurized chamber 21 is so small that the provision of the pressurized chamber 21 brings no advantage at all. In contrast, if the pressure is higher than 1/3, the pressure resistance required for the pressurized chamber 21 becomes high, so that the pressurized chamber 21 should meet the higher property requirement, but cannot be expected to improve its lifting performance any more. In addition, by setting the upper limit to 1/10, the pressure resistance required for the pressurized chamber 21 can be lowered, the receiving apparatus 20 can be made compact as a whole, and sufficient lifting performance can be achieved by using a deaeration system together as needed.

In addition, when the pressurized chamber 21 is formed in such a cyclone shape that the fluid mixture from the riser pipe 11 is introduced into the pressurized chamber 21 in its tangential direction as illustrated in FIG. 3, the pressurized chamber 21 may have a function as a separator to separate the gas from the slurry including the to-be-lifted substance by the centrifugal separation effect making use of the flow velocity of the fluid mixture. In this case, also, the separated gas A can be taken out from a top portion of the pressurized chamber 21, be sent to the compressor 30 while being kept compressed without expansion under the atmospheric pressure, and then be reused as the compressed air for bubble lift. Note that, in FIG. 3, a white circle indicates a bubble, a portion provided with cross hatching indicates slurry including a mixture of seawater and a target substance (sand, crushed mineral or the like), for example, a portion provided with single hatching indicates seawater only, and a white portion indicates a gas portion.

Moreover, the single-stage or multi-stage (three stages in FIG. 3) upward flow weir 22A, 22B, 22C is provided downstream of the pressurized chamber 21 in order to keep the pressure of the pressurized chamber 21 within the design range. Each stage of the upward flow weir 22A, 22B, 22C includes a pressure container 22a and a slurry pipe 22b housed in the pressure container 22a. Each stage of the upward flow weir 22A, 22B, 22C is configured to keep the pressure on the downstream side of the slurry pipe 22b within a design range by controlling the pressure of a gaseous portion in the pressure container 22a encompassing the upper end of the slurry pipe 22b. In addition, there are provided communicating pipes 28A, 28B through which the gaseous portions of the pressure containers 22a of the upward flow weir 22A, 22B, 22C and upper portions of the U seal 27A, 27B communicate with each other. Then, the single-stage or multi-stage U seal 27A, 27B (two stages in FIG. 3) using the pressures by liquid columns controls the pressures of the gaseous portions of the pressure containers 22a.

Each of the slurry pipes 22b of the upward flow weir 22A, 22B, 22C communicates with the pressurized chamber 21 or a lower portion of the pressure container 22b in the previous stage. The slurry pipe 22b guides slurry introduced from the previous stage from a lower portion thereof to an inner portion thereof, and causes the slurry to flow out from an upper portion thereof into the pressure container 22b. An amount of pressure reduced in each stage can be adjusted by using the height of the slurry pipe 22b and the specific gravity of the slurry. Moreover, the pressure of the lower portion of the slurry pipe 22b is equal to a sum of the pressure of the gaseous portion of the pressure container 22a and the hydraulic pressure of the slurry in the slurry pipe 22b. Thus, the pressure control of the gaseous portion of the pressure container 22a enables control of the adjustment of the pressure inside the pressurized chamber 21 or the pressure container 22b in the previous stage.

In other words, the operating pressures of the pressure containers 22a of the upward flow weir 22A, 22B, 22C can be kept by controlling the gas pressures inside the pressure containers 22a. The control of the gas pressures can be made by pressure regulation valves or the like provided to the gaseous portions, but may be made by the multi-stage seal 27A, 27B using the pressures of the liquid columns and having stages of a number corresponding to the number of stages of the upward flow weir 22A, 22B, 22C. The use of the multi-stage U seal 27A, 27B makes it possible to avoid a trouble which the pressure regulation valves or the like would otherwise have due to sand, dirt and the like flying like fog, for example.

In the configuration illustrated in FIG. 3, the upper portion of the pressure container 22a of the upward flow weir 22A at the first stage communicates with the upper portion of the U seal 27A at the first stage through the communicating pipe 28A, the upper portion of the pressure container 22a of the upward flow weir 22B at the second stage communicates with the upper portion of the U seal 27B at the second stage through the communicating pipe 28B, and the upper portion of the pressure container 22a of the upward flow weir 22C at the third stage is opened to the atmosphere through an open pipe 28C.

In this configuration, a pressure P3 inside the pressure container 22a of the upward flow weir 22C at the third stage is an atmospheric pressure Po, and a pressure P2 inside the pressure container 22a of the upward flow weir 22B at the second stage is a sum of the atmospheric pressure Po and a pressure Pb of the liquid column of the U seal 27B at the second stage. Then, a pressure P1 inside the pressure container 22a of the upward flow weir 22A at the first stage is a sum of the pressure P2 and a pressure Pa of the liquid column of the U seal 27A at the first stage. In summary, P3=Po, P2=Po+Pb, and P1=P2+Pa=Po+Pa+Pb hold. Thus, by controlling the pressures Pa, Pb of the liquid columns of the U seal 27A, 27B, the pressures P1, P2 inside the pressure containers 22a can be controlled.

The separation tank 23 is provided and connected to an exit of the upward flow weir 22C at the last stage of the upward flow weir 22A, 22B, 22C. The separation tank 23 temporarily stores the slurry containing the to-be-lifted substance, and settles the to-be-lifted substance to separate the to-be-lifted substance from seawater. In the case where the to-be-lifted substance in the slurry state is a slurry-like substance in itself, a sediment B is extracted from the lower side in consideration of a time required for settlement. The sediment B is accumulated on the lower side of the separation tank 23 and is pushed out from a lower exit by the pressure applied by its own weight inside the separation tank 23. Instead, the sediment B may be discharged by a slurry pump which is not illustrated. Then, the liquid (seawater) C from which the sediment B is removed is discharged as a supernatant fluid to the outside of the separation tank 23 from an upper exit. After the necessary post treatment such as removal of contained substances, the liquid C is returned to the ocean. In addition, part of the liquid (seawater) C is discharged from the upper side of the separation tank 23 by the U seal liquid refill pump 24 and is poured into the liquid pool 26 from the U seal liquid refill pipe 25. This liquid is used for the liquid columns of the U seal 27A, 27B.

The foregoing bubble lift system 10 can employ the bubble lift method including: installing the riser pipe 11 such that the riser pipe 11 extends from above the sea surface 2 (water surface) in the drill ship or the like floating on the sea surface 2 down to the sea bottom 3 or under the sea bottom 3; injecting and raising a gas in the bubble form by the gas injection apparatus 13 provided on the lower side of the riser pipe 11; suctioning the to-be-lifted substance, which is collected by the collector 12 provided at the lower end of the riser pipe 11, at the lower end side of the riser pipe 11 by using an effect that the gas produces by reducing the pressure of a fluid column inside the riser pipe 11; and when lifting the fluid mixture containing the to-be-lifted substance to the receiving apparatus 20 provided at the upper end of the riser pipe 11, performing deaeration by removing part of the bubbles or gas in the fluid mixture by the deaerator 14 provided on the upper end side of the rise pipe 11, and applying the pressure to the upper end inside the riser pipe 11 by the pressurized chamber 21 provided at the upper end portion of the riser pipe 11. Thus, the bubble lift system 10 is capable of suppressing the increase in the volume ratio of the bubbles or gas to the fluid mixture in the vicinity of the upper end of the riser pipe 11.

In addition, the to-be-lifted substance such as slurry accumulated in the lower portion of the pressurized chamber 21 is pushed out by the pressure inside the pressurized chamber 21 and flows upward in the upward flow weir 22A, 22B, 22C, i.e., flows upward inside the slurry pipe 22b provided in the dedicated one of the pressure containers 22a on the downstream side. While flowing upward inside each of the slurry pipes 22b of the upward flow weir 22A, 22B, 22C, the slurry containing the to-be-lifted substance loses a pressure by an amount corresponding to the liquid column and accordingly is decompressed. The pressure inside the dedicated pressure container 22a of the upward flow weir is kept lower by a certain degree than the pressure inside the pressurized chamber 21 so as to be in substantially equilibrium with the pressure of the decompressed slurry.

After flowing upward in each slurry pipe 22b of the upward flow weir 22A, 22B, 22G, the slurry falls down into the corresponding pressure container 22a, and the slurry accumulated in the bottom portion of the pressure container 22a is pushed out to another pressure container 22a in the next stage of the upward flow weir 22B or 22C on the downstream side. By repeating this, the pressure of the slurry containing the to-be-lifted substance is reduced to the atmospheric pressure eventually.

Next, description is provided for a bubble lift method of an embodiment according to the present invention using the foregoing bubble lift system 10. This bubble lift method is a method including: installing the riser pipe 11 such that the riser pipe 11 extends from a vicinity of the sea surface 2 down to the sea bottom 3 or under the sea bottom 3; injecting a gas in bubble form into the lower side of the riser pipe 11 to thereby cause the gas to rise; and by using an effect that the gas produces by reducing the pressure of the fluid column inside the riser pipe 11, suctioning the to-be-lifted substance, which is collected around the lower end of the riser pipe 11, into the lower end side of the riser pipe 11, and lifting a fluid mixture containing the to-be-lifted substance to the receiving apparatus 20 provided at the upper end of the riser pipe 11. The method also includes applying the pressure to the upper end inside the riser pipe 11 by the pressurized chamber 21 provided at the upper end portion of the riser pipe 11.

In addition, this bubble lift method also includes performing deaeration by removing part of the bubbles or gas in the fluid mixture by using the deaerator 14 provided on the upper side of the rise pipe 11.

According to the bubble lift system 10 and the bubble lift method of the foregoing configuration, there is no need for a slurry system to include a rotating machinery or instrument, a shut-off valve, a pressure regulation valve, a throttle valve, an orifice or the like which is highly likely to become malfunction due to damage, breakage, galling, jamming or the like in the process of lifting the to-be-lifted substance.

Figure 4:
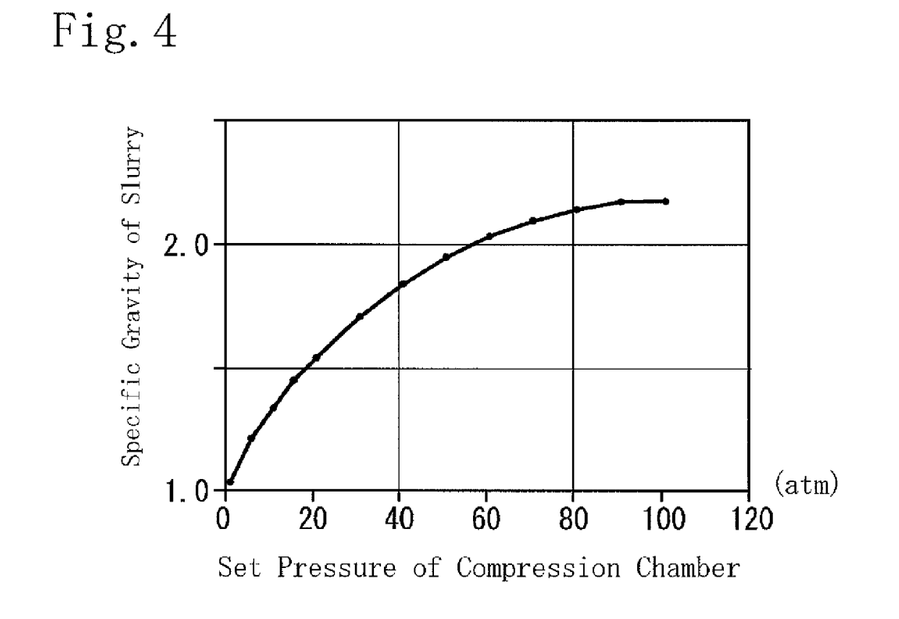
FIG. 4 is a diagram showing a relation between the set pressure of the pressurized chamber and the maximum specific gravity of slurry that can be lifted.
Figure 5:
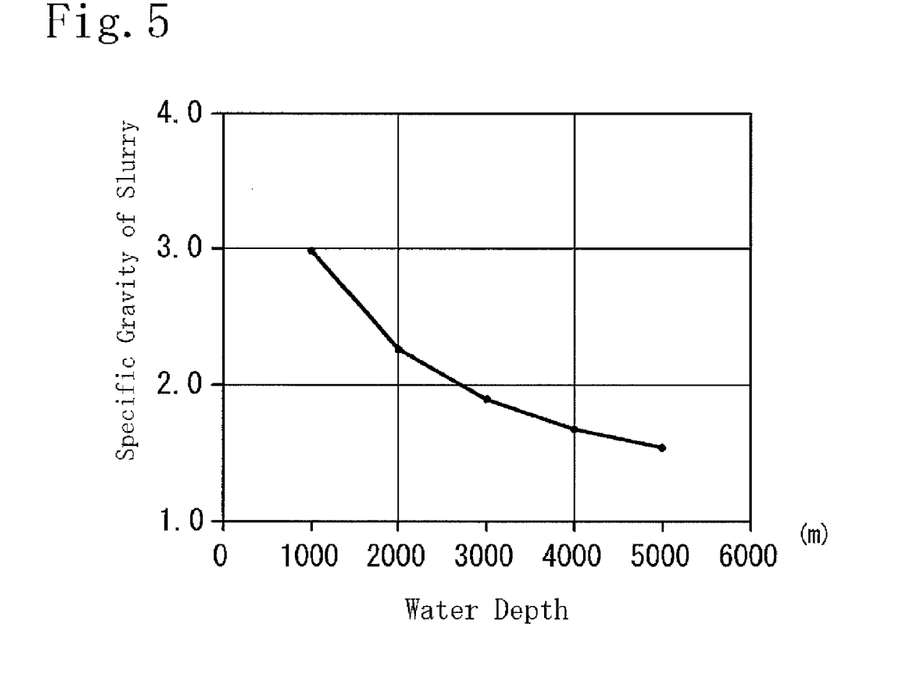
FIG. 5 is a diagram showing a relation between water depth and the maximum specific gravity of slurry that can be lifted with the set pressure of the pressurized chamber.

FIGS. 4 and 5 show results of computing simulation. FIG. 4 is a diagram showing a relation between the set pressure of the pressurized chamber 21 and the maximum specific gravity of a fluid mixture that can be lifted, where the horizontal axis indicates the set pressure of the pressurized chamber 21 and the vertical axis indicates the upper limit of specific gravity of slurry lifted by the bubble lift at a water depth of 5,000 m. FIG. 5 is a diagram showing a relation between the water depth and the maximum specific gravity of a fluid mixture that can be lifted under the set pressure of the pressurized chamber 21, where the horizontal axis indicates the water depth and the vertical axis indicates the upper limit of specific gravity of slurry lifted under a set pressure of 20 atmospheres in the pressurized chamber 21.

In this computing simulation, the foregoing bubble lift system 10 is assumed to lift a target substance from the water bottom 3, and the pressure of the pressurized chamber 21 and the injection volume of bubbles are fixed. The injection volume of bubbles is set to an upper limit volume at or below which the flow velocity of the fluid mixture at the upper end of the riser pipe 11 does not exceed 10 m per second even when the concentration of water in the slurry is 100%. With these settings fixed, if the specific gravity of the slurry increases along with an increase in the concentration of a solid, the flow velocity decreases whereas the bubble ratio increases. Here, a practical upper limit of specific gravity of slurry that can be lifted by the bubble lift system 10 is defined as the specific gravity of slurry at which the bubble ratio reaches 90% at the upper end of the riser pipe 11.

FIG. 4 shows performance change along with a change in the pressure setting of the pressurized chamber 21 at a water depth of 5,000 m. A case where the present invention is not applied is equivalent to the case where the pressure of the pressurized chamber 21 of the present invention is an atmospheric pressure. In this case, it can be said that it is impossible to lift slurry having a higher specific gravity than seawater. However, it is found that slurry having 1.5 times the specific gravity of seawater can be lifted when the pressure of the pressurized chamber 21 of the present invention is set to about 20 atmospheres. It is also found that slurry having two or more times the specific gravity of seawater can be lifted when the pressure of the pressurized chamber 21 is set higher. Only by providing the deaerator 14 in a single stage, however, the same effect can be obtained even with the pressure of the pressurized chamber 21 kept at 20 atmospheres (not shown).

Moreover, FIG. 5 shows performance change in the case where the bubble lift system 10 with the pressure of the pressurized chamber 21 set to 20 atmospheres is used at various water depths. FIG. 5 shows that slurry having about 3 times the specific gravity of seawater can be lifted at a water depth of 1,000 m, that the upper limit of the specific gravity decreases as the water depth becomes greater, and that slurry having about 1.5 times the specific gravity of seawater can be lifted even at a water depth of 5,000 m, as described above.

According to the bubble lift system 10 and the bubble lift method having the foregoing configuration in the present invention, the pressurized chamber 21 is provided at the upper end portion of the riser pipe 11, whereby in bubble lift in a deep water region at a water depth of 5,000 m, for example, an increase in the volume ratio occupied by bubbles at the upper end portion of the riser pipe 11 can be controlled within several ten times, which is a practical level. In contrast, in the conventional technique, the bubble lift under the same conditions is substantially impossible, because only a fluid slightly heavier by several percentages than seawater can be lifted in reality since the volume of bubbles at the upper end portion of the riser pipe 11 becomes as much as 500 times the volume at the lower end portion of the riser pipe 11.

This enables the bubble lift system 10 to lift a to-be-lifted substance in a deep water region, which is tremendously deeper than in the case of the conventional technique. In addition, this produces an effect of enabling efficient lifting by reducing a pressure loss that is substantially proportional to a square of the flow velocity. For example, the bubble lift of slurry having more than two times the specific gravity of seawater at a water depth of 5,000 m is made possible with practically sufficient performance.

Moreover, by providing deaerators 14 to middle portions of the riser pipe 11, not only the upper end portion of the riser pipe 11 but also several locations in a shallow water region can be set as locations where the bubble ratio reaches the maximum. Thus, the volume ratio occupied by bubbles can be made uniform in the whole riser pipe 11 from the deep water region to the shallow water region. As a result, the bubble ratio can be increased on average without an increase in the maximum flow velocity.

This makes it possible to lower the flow velocity in the whole riser pipe 11, especially, the flow velocity at the upper end portion of the riser pipe 11 significantly. Thus, the erosion problem is drastically reduced. As a result, the riser pipe 11, a portion connecting the upper end of the riser pipe 11 to the downstream process, and the like can be formed by using a metal having lower hardness, using a lightweight material or a corrosion resistant material such as a plastic or elastomer, or using a coating material, a liner material, a vibration control material, a vibration damping material, an elastic material capable of absorbing deformation, or the like.

This consequently produces an effect of enabling bubble lift in a deeper water region by using a lightweight riser pipe, a cost down effect by use of an inexpensive corrosion resistant coating or liner, and an effect of avoiding longitudinal vibration resonance with wave periods, vortex-excited vibration or the like by changing materials. In addition, use of a flexible riser or bellows in which a thin metal plate is used on an inner surface, or the like is made possible while not needing an expensive and complicated riser tensioner, telescopic joint or the like.

The lifting operation in the deep water region using the bubble lift system 10 and the bubble lift method having the foregoing configuration does not need highly-sophisticated components or heavy components requiring motive power and control, such as pumps and the like in a deep sea part or an intermediate-depth water part. Moreover, since bubbles reduce the specific gravity of a fluid mixture inside the riser pipe 11 to or below the specific gravity of surrounding liquid such as seawater or water, it is possible to largely lower the design load required for a rig to support a resultant force of the weight of the rise pipe 11 itself, a fluid weight, a tidal force and the like.

In addition, an evacuation needs to be done when the hydrographic conditions become blustery during the lifting operation. According to the bubble lift system 10 and the bubble lift method having the foregoing configuration, the evacuation can be done only by pulling up the riser pipe 11 in the exactly same manner as in a drilling rig of the conventional technique. Moreover, even when there occurs a situation where an evacuation is done with components outside a ship detached and left and where the left components cannot be retrieved eventually, it is possible to eliminate or minimize the possibility of leaving an expensive highly-sophisticated component and the like.

Further, the lift can be efficiently carried out with the relatively-narrow riser pipe 11 having an equal diameter from the lower end to the top end. For this reason, the lift in a deep water region can be achieved by using, as it is, the riser pipe 11 on the drilling ship or a drilling system for handling the riser pipe 11 in the conventional technique. Accordingly, the development cost can be cut greatly.

INDUSTRIAL APPLICABILITY

According to a bubble lift system and a bubble lift method of the present invention, a pressurized chamber is provided at an upper end portion of a riser pipe, whereby an increase in the volume ratio occupied by bubbles at the upper end portion of the riser pipe can be controlled within several ten times, which is a practical level, even in bubble lift in a deep water region. Thus, the system and method of the present invention are applicable in all the industrial fields where a solid, liquid, or slurry is lifted from a place such as a sea bottom, lake bottom, river bottom, or the ground below them, the fields including, for example, extraction of ocean bottom resources such as sea-floor hydrothermal deposit, manganese nodule, methane gas hydrate, rare earth, rare metal, cobalt rich crust or diamond; extraction of sand, gravel or the like; and dredging for an installation work or an offshore structure or the like.

EXPLANATION OF REFERENCE NUMERALS 1 drill ship
2 sea surface (water surface)
3 sea bottom (water bottom)
10 bubble lift system
11 riser pipe
12 collector
13 gas injection apparatus
14 deaerator (vent system)
14a outer wall
14b snail shape portion (volute portion)
14c ventilation pipe
14d vented air conveyor pipe (vent-dedicated pipe)
20 receiving apparatus
21 pressurized chamber (type additionally having a gas-slurry separation function)
22A, 22B, 22C upward flow weir
22a pressure container
22b slurry pipe
23 separation tank
24 U seal liquid refill pump
25 U seal liquid refill pipe
26 U seal liquid pool
27A, 27B U seal (air trap)
28A, 28B communicating pipe
30 compressor
32 air-sending pipe
A gas (bubble and gas)
B solid
C liquid (seawater)

The invention claimed is:

1. A bubble lift system for lifting a substance in solid or liquid form from a water bottom or under the water bottom to a vicinity of a water surface, comprising:
    a riser pipe through which the substance is lifted, the riser pipe having an inside, a lower end portion into which the substance is suctioned, and an upper end portion above the water surface from which the substance is discharged,
    means for injecting a gas into a lower side portion of the riser pipe to cause the gas to rise in the form of bubbles that reduce the pressure of a fluid column inside the rise pipe, and suck a substance into the riser pipe at the lower end portion of the riser pipe and lift the substance to a place above the water surface,
    means provided at the upper end portion of the riser pipe for applying a pressure to the inside of the riser pipe at the upper end portion to thereby suppress an increase in a volume ratio of the bubbles to a fluid mixture rising inside the riser pipe in a shallow water region, and
    means provided at an upper side portion of the riser pipe for generating a rotational flow of the fluid mixture rising inside the riser pipe to thereby gather the bubbles and gas towards a swirl axis by a centrifugal effect, and to discharge the gathered bubbles and gas to the outside of the riser pipe from a ventilation pipe having an opening portion at the swirl axis,
    wherein the means provided at the upper end portion of the riser pipe for applying a pressure to the inside of the riser pipe includes means for setting an application pressure thereof within such a preset pressure range that an injection volume of the gas injected into the lower side portion of the riser pipe has no need to be controlled dynamically according to a suctioning condition, that a flow velocity of the fluid mixture is kept within a predetermined range even when only surrounding water is suctioned, and that even when only a substance is suctioned, a design upper limit of specific gravity of the fluid mixture is still higher than the specific gravity of the suctioned substance.

2. The bubble lift system according to claim 1, wherein the means for generating a rotational flow of the fluid mixture rising inside the riser pipe is a deaerator having an outer wall and a spiral pipe housed entirely inside the outer wall.

3. The bubble lift system according to claim 1, wherein the means provided at the upper end portion of the riser pipe for applying a pressure to the inside of the riser pipe is a pressurized chamber.

4. The bubble lift system according to claim 3, further comprising:
    a compressor in fluid communication with the pressurized chamber and a lower side portion of the riser pipe, wherein the compressor recycles gas separated in the pressurized chamber while being still compressed, compresses the gas again, and sends the again-compressed gas to the lower side portion of the riser pipe.

5. The bubble lift system according to claim 3, wherein:
    the means provided at an upper side portion of the riser pipe for generating a rotational flow is a deaerator located in the shallow water region where the pressure inside the riser pipe is made higher than the pressure outside the riser pipe due to an effect by the pressurized chamber, and the deaerator discharges the bubbles or gas to water outside the riser pipe using a pressure difference between the inside and the outside of the riser pipe.

6. The bubble lift system according to claim 3, further comprising:
a single-stage or multi-stage upward flow weir, each stage of which includes a pressure container and a slurry pipe, provided downstream of the pressurized chamber in order to keep the pressure of the pressurized chamber within a design range,
wherein each stage of the upward flow weir includes means for keeping the pressure of a downstream side of the slurry pipe within a preset pressure range by controlling the pressure of a gaseous portion in the pressure container encompassing an upper end of the slurry pipe.

7. The bubble lift system according to claim 6, wherein:
the means for keeping the pressure of a downstream side of the slurry pipe within a preset pressure range comprises a U seal and a communication pipe through which the gaseous portion of the pressure container of the upward flow weir and an upper portion of the U seal communicate with each other, and the U seal is provided in a single stage or multiple stages, and
the U seal controls the pressure of the gaseous portion of the pressure container using the pressure of a liquid column.

8. The bubble lift system according to claim 3, wherein the means for generating a rotational flow of the fluid mixture rising inside the riser pipe is a deaerator having an outer wall and a spiral pipe housed entirely inside the outer wall.

9. The bubble lift system according to claim 8, wherein:
the means provided at an upper end portion of the riser pipe for applying a pressure to the inside of the riser pipe is a pressurized chamber and the means for generating a rotational flow of the fluid mixture rising inside the riser pipe is a deaerator having an outer wall and a spiral pipe housed entirely inside the outer wall, and
the bubble lift system further comprises a vented air conveyor pipe connected to the ventilation pipe for recycling the bubbles or gas discharged to the outside of the riser pipe by the deaerator into the inside of the pressurized chamber.

10. The bubble lifts system according to claim 8, further comprising
a multi-stage compressor in fluid communication with the pressurized chamber and the lower side portion of the riser pipe, wherein the multi-stage compressor recycles gas separated in the pressurized chamber and sends the recycled gas to the lower side portion of the riser pipe again, and
a vented air conveyor pipe connected to the ventilation pipe to a stage in the multi-stage compressor having a higher pressure than that for the gas from the pressurized chamber, for discharging the bubbles or gas to the outside of the riser pipe from the ventilation pipe via the deaerator.

11. A bubble lift method including:
installing a riser pipe such that the riser pipe extends from a vicinity of a water surface down to a water bottom or under the water bottom;
injecting a gas in the form of bubbles into a lower side portion of the riser pipe to cause the bubbles to rise;
using an effect that the bubbles produce by reducing the pressure of a fluid column inside the riser pipe, suctioning a substance, which is collected around a lower end of the riser pipe, into a lower end side of the riser pipe, and lifting a fluid mixture containing the substance to a receiving apparatus provided at an upper end of the riser pipe;
setting an application pressure of a pressurized chamber within such a preset pressure range that an injection volume of the gas injected into the lower side portion of the riser pipe has no need to be controlled dynamically according to a suctioning condition, that a flow velocity of the fluid mixture is kept within a predetermined range even when only surrounding water is suctioned, and that even when only the substance is suctioned, a design upper limit of specific gravity of the fluid mixture is still higher than the specific gravity of the suctioned substance; and
using the pressurized chamber provided at an upper end portion of the riser pipe to apply a pressure to an upper portion inside the riser pipe;
using a deaerator provided on an upper side of the riser pipe to perform deaeration by removing part of the bubbles or gas in the fluid mixture.

12. The bubble lift method according to claim 11, further comprising the step of:
adjusting the pressure of the pressurized chamber to 1/50 to 1/3, both inclusive, of the hydraulic pressure of the lower end portion of the riser pipe.

13. The bubble lift method according to claim 11, further comprising the steps of
recycling gas separated in the pressurized chamber to a compressor while being still compressed,
compressing the compressed again in the compressor, and
sending the again-compressed, recycled gas to a lower side portion of the riser pipe.

14. The bubble lift method according to claim 11, further comprising the step of
using the deaerator to generate a rotational flow of the fluid mixture rising inside the riser pipe to thereby gather the bubbles and gas towards a swirl axis by a centrifugal effect, and to discharge the gathered bubbles and gas to the outside of the riser pipe from a ventilation pipe having an opening portion at the swirl axis.

15. The bubble lift method according to claim 11, further comprising the steps of:
using a multi-stage compressor to compress gas separated in the pressurized chamber and to recycle it into the multi-stage compressor;
sending the recycled gas to the lower side portion of the riser pipe again,
using the deaerator to discharge the bubbles or gas to the outside of the riser pipe from the ventilation pipe, and
recycling the discharged bubbles or gas through the vented air conveyor pipe connected to the ventilation pipe to a stage in the multi-stage compressor having a higher pressure than that for the gas from the pressurized chamber, for discharging the bubbles or gas to the outside of the riser pipe from the ventilation pipe.

16. The bubble lift method according to claim 11, further comprising the step of:
locating the deaerator in a shallow water region where the pressure inside the riser pipe is made higher than the pressure outside the riser pipe due to an effect by the pressurized chamber, and wherein the step of using a deaerator provided on an upper side of the riser pipe to perform deaeration includes using the deaerator to discharge the bubbles or gas to water outside the riser pipe using a pressure difference between the inside and the outside.

* * * * *